April 3, 1945. H. L. DENTON 2,372,815
SPROCKET GEAR SCRAPING DEVICE
Filed Nov. 11, 1942 5 Sheets-Sheet 1
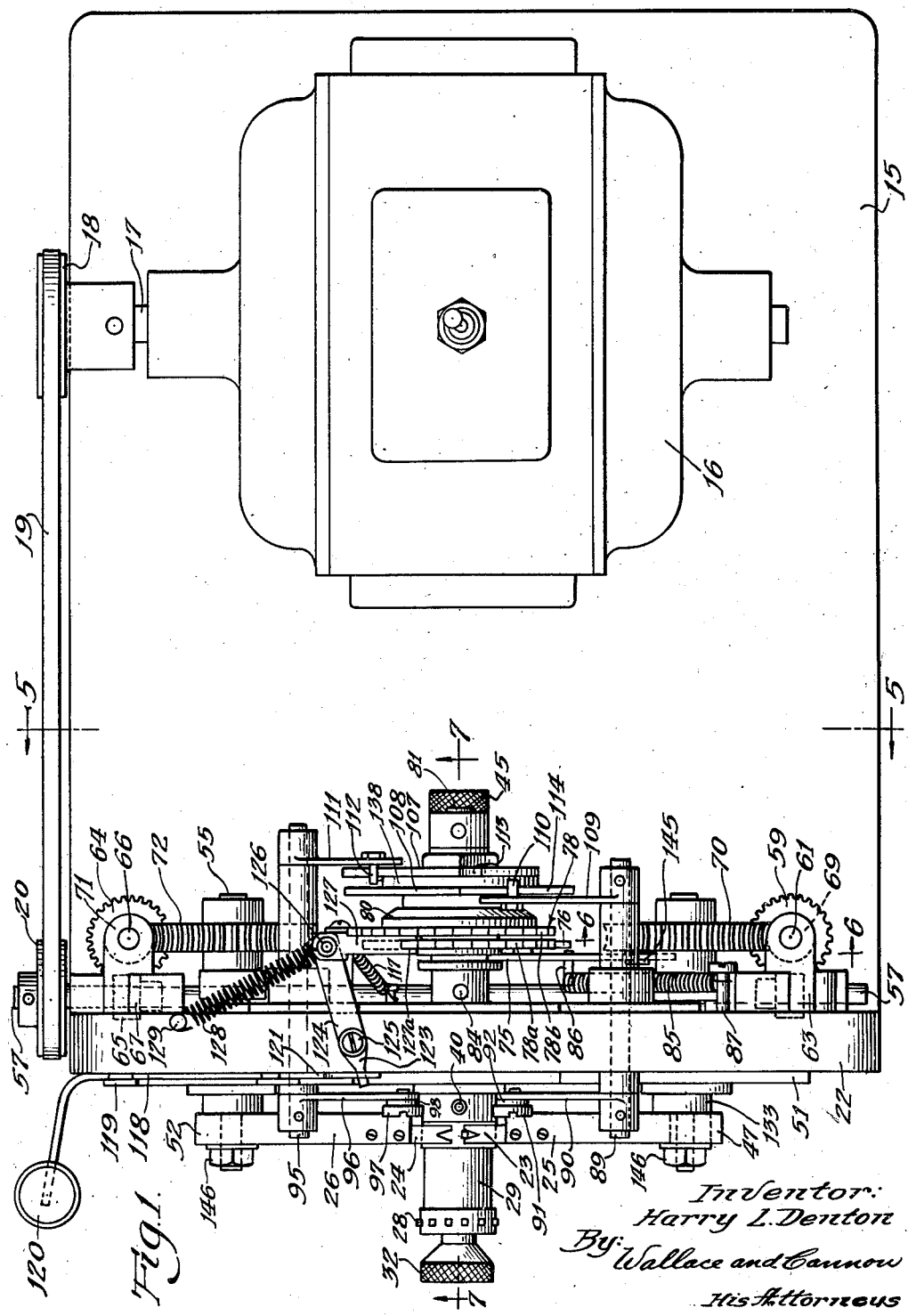
Inventor:
Harry L. Denton
By: Wallace and Cannow
His Attorneys

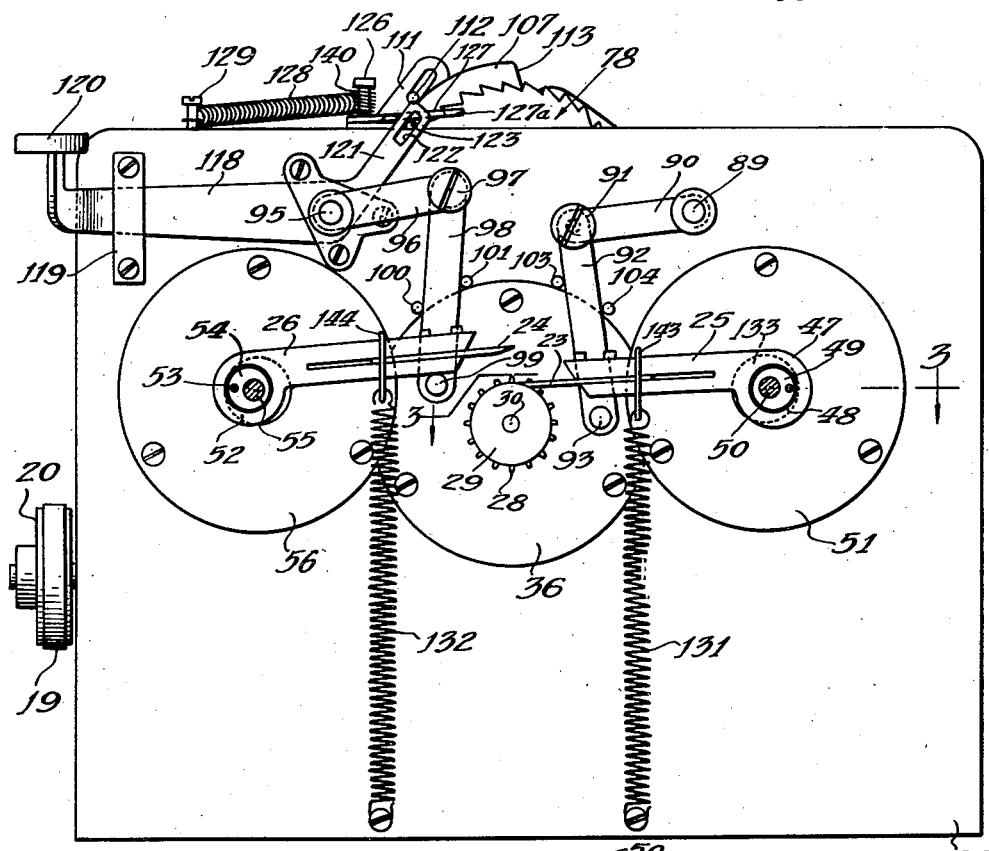
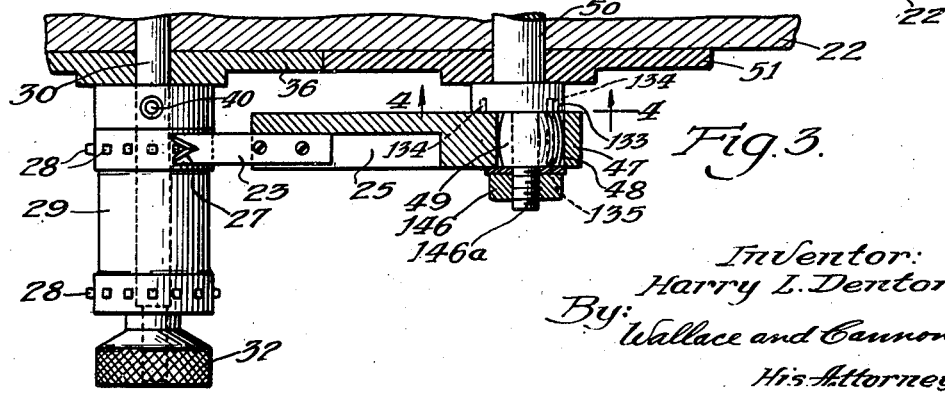

April 3, 1945. H. L. DENTON 2,372,815
SPROCKET GEAR SCRAPING DEVICE
Filed Nov. 11, 1942 5 Sheets-Sheet 3

Inventor:
Harry L. Denton
By Wallace and Cannon
His Attorneys

April 3, 1945.  H. L. DENTON  2,372,815
SPROCKET GEAR SCRAPING DEVICE
Filed Nov. 11, 1942  5 Sheets-Sheet 4

Inventor:
Harry L. Denton.
By Wallace and Cannon
His Attorneys

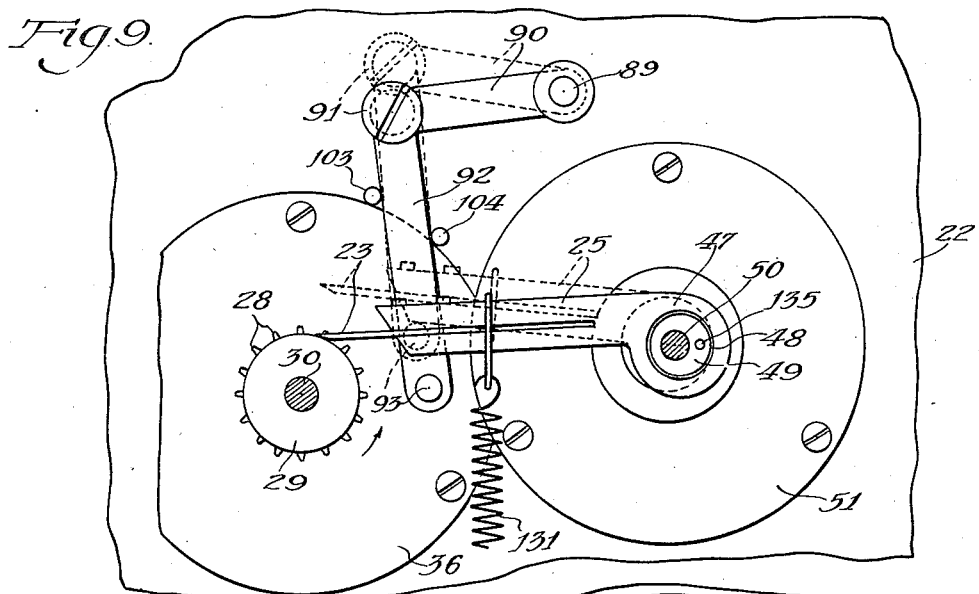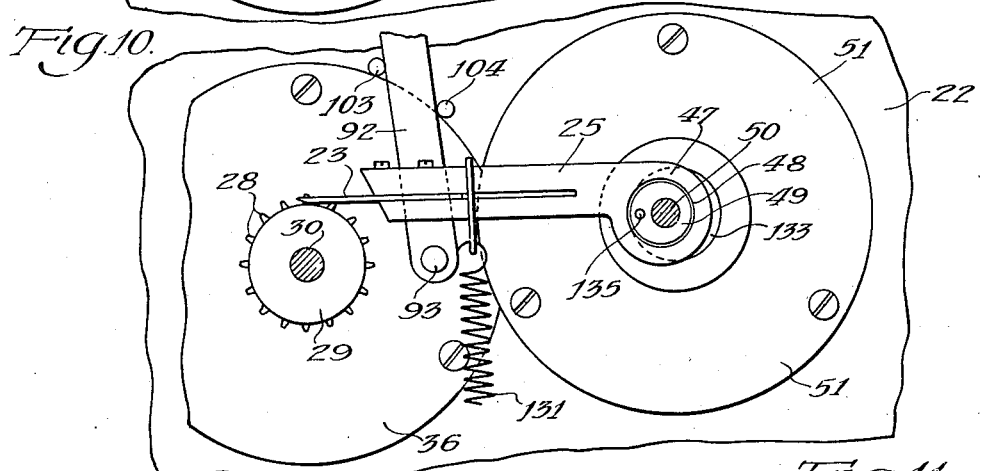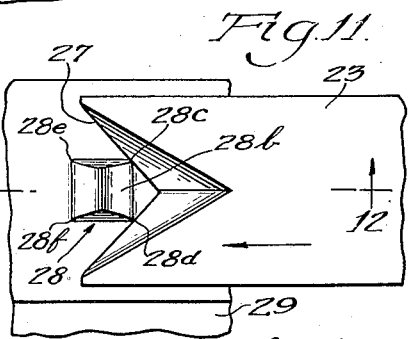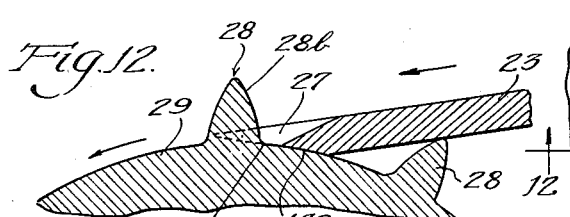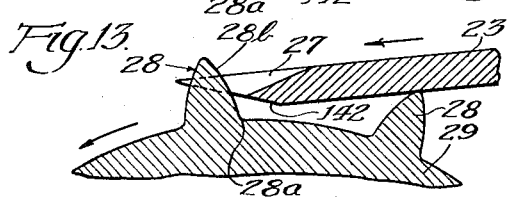

Patented Apr. 3, 1945

2,372,815

UNITED STATES PATENT OFFICE 2,372,815

SPROCKET GEAR SCRAPING DEVICE

Harry L. Denton, Chicago, Ill., assignor to Wenzel Projector Company, Chicago, Ill., a corporation of Illinois Application November 11, 1942, Serial No. 465,275

14 Claims. (Cl. 90—1.4)

This invention relates to a sprocket gear scraping device and, more particularly, to a device for scraping sprocket gears or toothed wheels of the character which are employed in or as a part of the film advancing mechanisms of motion picture projectors and the like.

In the manufacture of sprocket gears, such as those which are used in or as a part of the film advancing devices of motion picture projectors, burrs or sharp portions remain upon the corners or corner edges of the gear teeth after the latter have been formed and it has been customary heretofore to remove these burrs or sharp portions by means of a manual scraping operation since if they were allowed to remain upon the sprocket gears they would tear the film during the use of such sprocket gears in advancing film through a motion picture projector. Such manual scraping is, however, a slow and laborious operation and materially adds to the cost of manufacturing sprocket gears of the character hereinbefore referred to and which are used in large quantities.

An object of the present invention is to afford a novel device for mechanically and automatically scraping the corner edges of sprocket gear teeth such, for example, as those which are employed in or as a part of the film advancing devices of motion picture projectors, to remove the burrs or sharp portions remaining thereon after and as a result of the forming or gear cutting or shaping operation, to the end that the cost of manufacturing such sprocket gears or toothed wheels may be reduced and their production materially expedited compared with relative to the prior art practice of manufacturing such sprocket gears and which has involved the aforesaid operation of manually scraping the gear teeth embodied therein so as to remove the burrs or sharp portions therefrom.

Another object of the invention is to afford a novel mechanism for mechanically and automatically scraping and slightly rounding all of the corners or corner edge portions of the teeth of sprocket gears of the character which are embodied in the film advancing devices of motion picture projectors and the like so as to prevent the corner edges of the sprocket gear teeth from gradually tearing or cutting the corner portions of the sprocket tooth-receiving openings in the motion picture films with which such sprocket teeth engage.

A further object of the invention is to provide, in combination, in the new sprocket gear or toothed wheel scraping device, a pair of spaced scraping knives adapted to scrape opposite sides of teeth upon a sprocket gear supported therebetween, together with novel means for moving one of the scraping knives into ineffective position after said one scraping knife has completed its normal cycle of operations, that is to say, after it has scraped all of the teeth in an annular row of such teeth upon said sprocket gear, from one side thereof, together with novel means for then moving the other of the said pair of spaced scraping knives into effective position so as by means thereof to scrape all of the said teeth in the said annular row of the same from the opposite side thereof.

An additional object of the invention is to afford in the new sprocket gear scraping device novel means for supporting a sprocket gear between two spaced scraping knives which are embodied in the invention and in such a manner that said sprocket gear may be advanced circumferentially in a step by step movement around and relative to its supporting means during and as an incident to the scraping operation performed thereon by each of said scraping knives, first in one circumferential direction by one of said scraping knives, and then in the other or opposite circumferential direction by the other of said scraping knives, so as to scrape each of the teeth in an annular row of such teeth from two sides thereof.

A further object of the invention is to afford in the new sprocket gear scraping device novel means for supporting a sprocket gear, having at least two spaced annular rows of teeth thereon, and said sprocket gear may be moved or advanced circumferentially in a step by step movement, relative to and upon its supporting means, by each of the scraping knives, during and as an incident to the scraping operation, while being restrained from free rotation upon and relative to said supporting means and in such a manner that after the completion of the scraping operation upon all of the teeth in one of said annular rows of teeth upon a sprocket gear, said sprocket gear may be removed from its supporting means and its position thereon reversed so that the teeth in the outer row of said teeth on said sprocket gear may be scraped by said scraping knives.

Another object of the invention is to provide in the new sprocket gear scraping device novel means for accommodating the throw or extent of movement of each of the scraping knives to sprocket gears of varying pitch, that is to say, to use upon sprocket gears which differ from each other by having teeth spaced at different circumferential distances.

Still another object of the invention is to provide in the new sprocket gear scraping device novel manually operable means for initiating the scraping action of each of the scraping knives.

Other and further objects of the present invention will be apparent from the following description and claims and will be understood by reference to the accompanying drawings which, by way of illustration, show preferred embodiments of the invention and the principles thereof, and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 1 is a top plan view of a preferred form of the new sprocket gear tooth scraping device;

Fig. 2 is a side elevational view of the new sprocket gear tooth scraping device as seen from the left-hand side in Fig. 1;

Fig. 3 is an enlarged fragmentary horizontal sectional top plan view on line 3—3 in Fig. 2;

Fig. 4 is a detail view, on line 4—4 in Fig. 3, partly in section and partly in elevation, and illustrating a device for adjusting the scraper knives to impart to them varying throws or orbits or paths of movement so as to enable them to scrape the teeth of sprocket gears in which the teeth are arranged at different or varying distances;

Fig. 9 is a fragmentary side elevational view and showing, in full lines, one of the sprocket gear tooth scraping knives in effective position and in the position which it assumes in the initial stage of its cycle of operations and showing, in dotted lines, the same scraping knife raised up out of effective or scraping position;

Fig. 10 is a view similar to Fig. 9 but showing the sprocket gear tooth scraping knife which is shown in Fig. 9 in the position which it assumes at a further stage in its cycle of operations;

Fig. 11 is a fragmentary top plan view showing one of the sprocket gear tooth scraping knives, which are embodied in the present invention, in the position which it assumes in the initial stage of its operative cycle in effecting a gear tooth scraping operation;

Fig. 12 is a fragmentary sectional view on line 12—12 in Fig. 11; and

Fig. 13 is a view similar to Fig. 12 but showing the same gear tooth scraping knife which is shown in Fig. 12 in the position which it assumes immediately following the position in which it is shown in Fig. 12.

General

Figure 5:
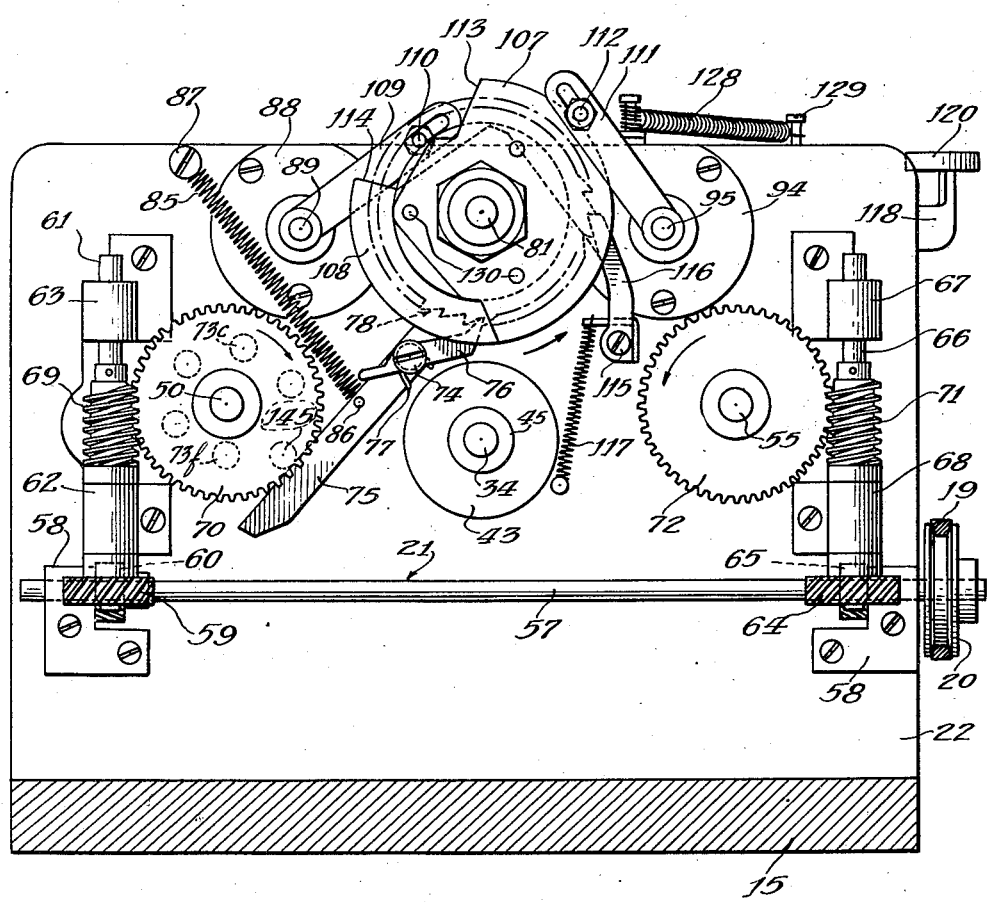
Fig. 5 is a view on line 5—5 in Fig. 1, partly in section and partly in elevation, and illustrating certain of the operating mechanisms embodied in the invention.

A preferred embodiment of the new toothed wheel or sprockekt gear scraping device is illustrated in the drawings and comprises a horizontally extending supporting base 15 upon which a source of power in the form of an electric motor 16 is mounted. The motor 16 has a shaft 17 upon which a pulley 18 is mounted and working around the pulley 18 is a power transmitting member in the form of a V-shaped belt 19. The belt 19 works over a pulley 20 which is carried by a horizontally extending shaft 57 (Fig. 5) which is embodied in and forms a part of the operating mechanism of the new gear tooth scraping device. The operating mechanism of the new sprocket gear tooth scraping device is generally indicated at 21, (Fig. 5), and is shown as being mounted upon an upwardly or vertically extending supporting member 22 which is mounted upon and carried by the horizontally extending base 15 at one end thereof (Fig. 1) and in spaced relationship with the motor 16.

The new sprocket gear tooth scraping device includes a pair of sprocket gear tooth scraping knives 23 and 24, which are shown in Fig. 2, and which are operated by the operating mechanism 21, in a manner which will be described hereinafter. The sprocket gear tooth scraping knife 23 is mounted upon and is carried by a supporting arm or carrier 25 and the scraper knife 24 is mounted upon and carried by a supporting arm or carrier 26. The supporting arm 25 and the scraper knife 23 carried thereby are normally urged downwardly by a spring 131 and the supporting arm 26 and the scraper knife 24 carried thereby are normally urged downwardly by a spring 132. It will be noted, in this connection, and as shown in Fig. 2, that the upper end portion of the spring 131 is loosely attached to the supporting arm 25 for the scraper knife 23 by means of a U-shaped yoke 143 and that the upper end portion of the spring 132 is loosely attached to the supporting arm 26 for the scraper knife 24 by means of a U-shaped yoke 144, for a reason to be explained hereinafter, the lower end portions of the springs 131 and 132 being anchored to the upright supporting member 22 at the front thereof.

In the use of the new sprocket gear tooth scraping device the gear tooth scraping knives 23 and 24 are moved through a cycle and path of operations in such a manner that they cooperate successively to scrape the edge portions and faces of a row of sprocket gear teeth upon sprocket gears such, for example, as the sprocket gears which are embodied in the film-advancing devices of motion picture projectors and the like. To this end the scraping knives 23—25 and 24—26 are alternately lowered and raised out of effective or scraping position under the control of a control device which is particularly shown in Figs. 2, 5, 7 and 8 wherein it is generally indicated at 133.

As shown in Figs. 3, 11, 12 and 13, the gear tooth scraping knife 23 has a notched or indented and sharpened outer end portion 27, which is substantially triangular in plan, and this notched portion 27 of the scraper knife 23 has a beveled foot portion 142 (Figs. 12 and 13) and the gear tooth scraping knife 24 is similarly formed. In the use of the new gear tooth scraping device these indented and sharpened end portions 27 of the scraper knives 23 and 24 are caused to receive and to work successively over the edge portions or faces of a row of teeth 28 on a sprocket gear, such as 29, and the mechanisms for cyclically operating the scraping knives 23 and 24, and for controlling their operation, will now be described.

*Sprocket gear supporting device*

Figure 7:
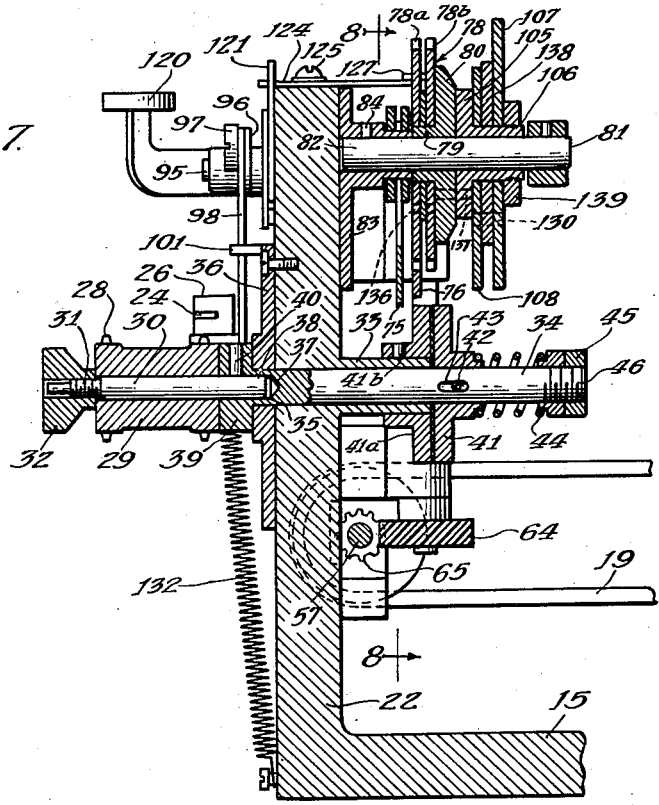
Fig. 7 is a central vertical sectional view on line 7—7 in Fig. 1 and illustrating the construction of the sprocket gear supporting shaft and the arrangement of control cams and advancing mechanism therefor which are embodied in the invention.

As shown in the drawings, in the use of the new sprocket gear tooth scraping device, a sprocket gear, such as 29, is mounted upon a horizontally extending supporting shaft or carrier 30 and this supporting shaft 30 has a threaded outer end portion 31 (Fig. 7) upon which a knurled finger grip or knob 32 is mounted. As shown in Fig. 7, the upwardly extending supporting member 22 has a horizontally projecting bearing boss or extension 33 in which a supporting stub shaft 34 is slidably and non-rotatably mounted. This stub shaft 34 has an outer or front end portion 35 which projects into a centrally arranged bearing opening which is formed in a bearing plate 36 which is carried by the upright supporting plate 22. Formed in the outer or front end portion 35 of the stub shaft 34 is a socket 37 and the inner end portion 38 of the sprocket gear supporting shaft 30 projects into this socket 37. The slidable shaft 34 has an enlarged front end portion 39 that the sprocket gear supporting shaft 30 is detachably keyed to the said enlarged portion 39 of the slidable shaft 34, as at 40, as shown in Fig. 7. Thus it will be seen that the parts 30 and 34 when keyed together, form, in effect, a single horizontally extending slidable but non-rotatable shaft for supporting a sprocket gear, such as 29, during the operation of scraping the teeth 28 thereon by means of the scraping knives 23 and 24, as will be explained more fully hereinafter.

Carried by and keyed to the bearing portion 33 of the upright supporting member 22, as shown in Fig. 7, is a stationary disc 41a which is keyed to the said bearing portion 33 as at 41b. A friction disc or collar 41 is slidably mounted on the shaft 34 and carries a pin 42 and this pin 42 projects into and works in a slot 43 which is formed in the shaft 34. A coil spring 44 is mounted upon the shaft 34. This spring 44 bears at its inner end against a reduced portion of the collar 41 and at its outer end the spring 44 bears against a nut 45 which is threaded onto a threaded outer end portion 46 of the shaft 34 and, as may be seen by reference to Fig. 7, the coil spring 44 is retained upon the shaft 34, and its tension thereon may be adjusted by manipulating the adjustable retaining nut 45.

The foregoing arrangement is such that a sprocket gear, such as 29, may be inserted or mounted upon the supporting shaft 30 and secured in position thereon by adjusting the finger grip or nut 32 so as to bind the axially inner end portion of the sprocket gear 29 against the outer surface of the flange 39 on the shaft 34. In this manner the sprocket gear 29 is held upon its supporting shaft 30 in such a manner that the sprocket gear 29 is free to be rotated or advanced circumferentially in a step by step motion, in one direction, by one of the scraping knives 23 or 24, and subsequently in the opposite direction by the other gear tooth scraping knife, while being restrained from rotation upon its supporting shaft 30 by means of the spring 44 and the tension exerted thereby upon the friction disc 41 and, through the latter, upon the stationary collar or disc 41a. Thus it will be seen that the coil spring 44 and the friction disc 41 and the stationary collar or disc 41a act as a friction clutch or restraining brake relative to and upon the sprocket gear supporting shaft 30—34.

It will also be noted, in this connection, that the pin and slot arrangement 42—43 permits the sprocket gear supporting shaft 30—34 to have limited sliding movement in and relative to the upright supporting member 22 and the stationary bearing parts 36 and 33—41.

*Eccentric scraper knife mounting*

As best shown in Fig. 2 of the drawings, the supporting arm 25, which carries the sprocket tooth scraping knife 23, includes a bearing portion or sleeve 47 at its inner end and this bearing portion or sleeve 47 has a bearing opening 48 formed therein. An eccentric member works in the bearing opening 48 and this eccentric member 49 is carried by a horizontally extending shaft 50 which is journaled in a bearing plate 51 which is mounted upon the upright supporting member 22 at the front thereof (Figs. 2 and 3). This shaft 50 also has a portion which projects rearwardly of the upright supporting member 22 (Fig. 5) for reasons which will be explained hereinafter.

As shown in Fig. 2, a similar eccentric construction is associated with the gear tooth scraping knife 24, and its supporting arm or carrier 26, that is to say, the scraper knife supporting arm or carrier includes a bearing sleeve or portion 52 at its inner end and this bearing sleeve or portion 52 has a centrally arranged bearing opening 53 formed therein. An eccentric member 54 works in the bearing opening 53 and this eccentric member 54 is mounted upon a horizontally extending shaft 55 which is journaled in a bearing plate 56 which is mounted upon the upright supporting member 22, at the front thereof, as shown in Fig. 2. This shaft 55 has a portion which projects rearwardly of the upright supporting member 22, for reasons which will be explained hereinafter.

*Scraper knife operating mechanism*

The operating mechanism for the gear tooth scraping knives 23—25 and 24—26 will now be described, following which the control mechanism, by which the scraping knives 23—25 and 24—26 are alternately lowered into and raised out of effective or sprocket gear tooth scraping position, will be described.

The operating mechanism for the scraping knives 23—25 and 24—26 includes the horizontally extending drive shaft 57 which is arranged at the rear side of the upright supporting member 22 and which has its end portions journaled in bearing blocks 58 which are attached to the upright supporting member 22 at the rear thereof (Fig. 5). One end portion of the shaft 57 carries a gear 60 and this gear 60 meshes with a gear 59 which is carried by a vertically extending shaft 61 (Fig. 5). The shaft 61 is journaled in bearing blocks 62 and 63 which are mounted upon the upright support 22 at the rear thereof. Similarly, the other end portion of the shaft 57 carries a gear 65 which meshes with a gear 64 which is carried by a vertically extending shaft 66, and this shaft 66 is journaled in bearing blocks 67 and 68 which are mounted upon the upright support 22 at the rear thereof (Fig. 5).

The shaft 61 carries a worm wheel 69 and this worm wheel 69 meshes with a worm gear 70 which is mounted at the rear of the upright support 22 upon an extension of the shaft 50. Similarly, the shaft 66 carries a worm wheel 71 and this worm wheel 71 meshes with a worm gear 72 which is mounted at the rear of the upright support 22 upon an extension of the shaft 55 (Fig. 5).

*Scraper knife control mechanism*

Figure 6:
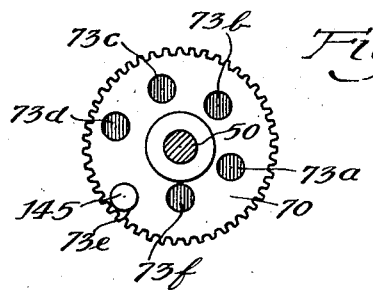
Fig. 6 is a view on line 6—6 in Fig. 1, partly in section and partly in side elevation and illustrating a device for controlling the throw or extent of movement of a ratchet advancing pawl and its supporting lever which are embodied in the present invention.

Formed in the gear 70, upon the rear side thereof, and as shown in Figs. 5 and 6, is a radially arranged series of openings or sockets 73a, 73b, 73c, 73d, 73e and 73f, these openings being arranged at varying or different radial distances upon the worm gear 70, for a reason which will be explained hereinafter. Selectively insertable into any one of the openings or sockets 73a to 73f, inclusive, is a pin or stud 145.

A lever 75 is pivotally mounted between its ends upon the upright supporting member 22, at the rear thereof, as at 74, and pivotally mounted upon the lever 75, at 74, is a pawl 76. The pawl 76 is normally urged, by a spring 77, relative to and upon the lever 75, in a direction to engage the teeth of a ratchet 78a, and the lever 75 is urged by a spring 85 (Fig. 5) in a direction to engage the pawl 76 with the ratchet 78a. As shown in Fig. 5, the spring 85 has one end portion attached to the lever 75, as at 86, and the other end portion of the lever 75 is attached to the upright support 22, and at the rear side thereof, as at 87.

As shown in Fig. 7, a second ratchet 78b is also mounted upon the hub 79 of the spacing collar 80 and is keyed to the ratchet 78a as at 136. A latch or holding dog 116 (Figs. 5 and 8) is urged by a spring 117 into engagement with the ratchet 78a and the dog 116 restrains the two ratchets 78a and 78b, and associated parts, against retrograde movement upon and relative to the shaft 81, Fig. 7, and are mounted upon a hub portion 79 of the spacing disc or collar 80 which is rotatably mounted upon a stub shaft 81. As best shown in Fig. 7, the stub shaft 81 has an end portion 82 which is mounted in a socket formed in a bearing plate 83. The bearing plate 83 is mounted upon the upright supporting member 22 at the rear side thereof, and the stub shaft 81 is keyed to a hub portion of the bearing plate 83 as at 84 (Fig. 7).

Likewise mounted upon the stub shaft 81 (Fig. 7) is a spacing collar 105 and this spacing collar 105 is keyed to the spacing collar 80, as at 137. The spacing collar 105 has a hub portion 106 and mounted upon this hub portion 106 of the spacing collar 105 are a pair of mutilated cams 107 and 108 which are separated by a spacing disc 138. The two cams 107 and 108 and the spacing disc 138 therebetween are keyed together, as at 130, and these parts are retained upon the shaft 81 by means of a nut 139 which is threaded onto a threaded outer end portion of the hub 106 of the spacing collar 105.

The purpose and function of the cams 107 and 108 and of the ratchets 78a and 78b, and associated parts, including the cam followers which are associated with the cams 107 and 108, will be described hereinafter.

A bearing plate or bracket 88 is attached to the upright supporting member 22, above the worm gear 70, as shown in Fig. 5, and a shaft 89 extends through an opening formed in the upright supporting member 22, and has its rear end portion journaled in the bearing plate or bracket 88.

The shaft 89 has a front end portion which projects forwardly of the upright supporting member 22 and carries a link 90 and this link 90 is pivotally connected as at 91, to a depending arm 92. A laterally or forwardly extending stud or pin 93 is mounted upon the lower end portion of the arm 92 and this stud or pin 93 projects under the outer end portion of the carrier or supporting arm 25 for the scraper knife 23, as shown in Fig. 2. A pair of guide pins 103 and 104 are associated with the depending arm 92, these guide pins 103 and 104 being mounted in the upright supporting member 22, at the front thereof, and upon opposite sides of the depending arm 92 (Fig. 2).

A bearing plate or bracket 94, similar to the bearing plate or bracket 88, is attached to the upright supporting member 22, at the rear thereof, and above the worm gear 72. A horizontally extending shaft 95 projects through an opening formed in the upright supporting member 22 and has its rear end portion journaled in the bearing plate 94. This shaft 95 also includes a portion which projects forwardly of the upright supporting member 22 and carries a link 96, and this link 96 is pivotally connected, as at 97, to a depending arm 98 (Fig. 2). A laterally projecting stud or pin 99 is mounted upon the lower end portion of the depending arm 98 and this stud 99 projects under the outer end portion of the carrier member or supporting arm 26 for the scraper knife 24, as best shown in Fig. 2. The arm 98 is guided during its movement, which will be described hereinafter, by means of a pair of spaced guide pins 100 and 101 which are mounted upon the upright supporting member 22, at the front thereof, and which are similar to the guide pins 103 and 104 which are associated with the arm 92.

The construction and mounting of the cam followers associated with the cams 107 and 108 will now be described.

Figure 8:
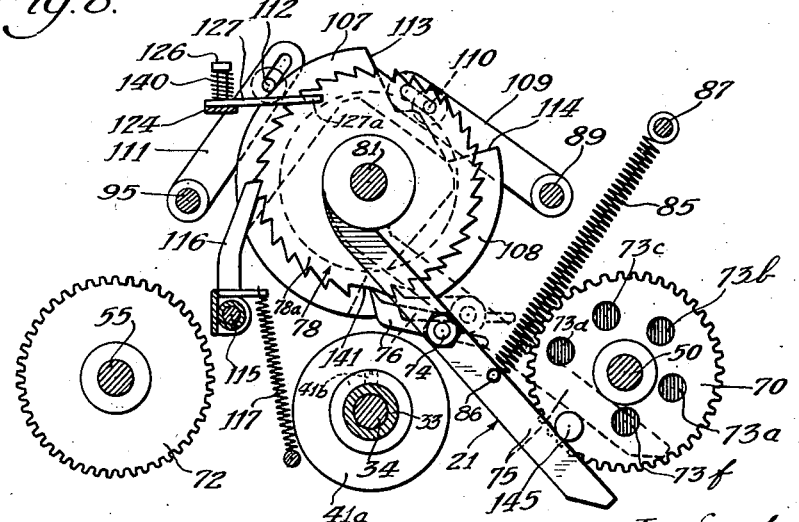
Fig. 8 is a view on line 8—8 in Fig. 7, partly in section and partly in side elevation.

Mounted upon the shaft 89, rearwardly of the upright supporting member 22, and fast to the shaft 89, is an arm 109 and this arm 109 carries a cam roller or follower 110 which rides upon the peripheral edge and cam surface of the cam 108, as shown in Figs. 1, 5 and 8.

Similarly, an arm 111 is mounted upon the shaft 95, rearwardly of the upright supporting member 22, and this arm 111 carries a cam roller or follower 112 which rides upon the peripheral edge and cam surface of the cam 107, as shown in Figs. 1, 5 and 8. The peripheral edge and cam surface of the cam 107 is provided with an interrupted or cut-out portion 113 and the peripheral edge and cam surface of the cam 108 is provided with a similar interrupted or cut-out portion 114, for reasons which will be explained hereinafter.

*Manual starting device*

A manually operable starting lever 118 is mounted upon the shaft 95, at the front of the upright support 22. The lever 118 is guided in a guiding element 119 and has an angled end portion which is provided with a manually operable portion or key 120. The lever 118 also has an upwardly extending inner end portion or arm 121 and provided in the arm 121 is a slot 122. A lever 124 is pivotally mounted, between its ends, as at 125, upon the top wall of the upright supporting member 22, and this lever 124 has an arm 123 which projects into and works in the slot 122 which is formed in the upwardly extending arm 121 of the manually operable lever 118, as shown in Figs. 1 and 2. Mounted upon the lever 124 is an upwardly extending pin 126 upon which a coil spring 140 is mounted (Figs. 2 and 8). A pawl 127 is pivotally connected to the pin 126, below the coil spring 140, and this pawl 126 has a bifurcated portion 127a (Fig. 1) which engages with the teeth of the ratchet 78a. A spring 128 has one end portion attached to the pin 126 on the lever 124, and the other end portion of this spring 128 is anchored, as at 129, in the upper edge portion of the upright supporting member 22.

The ratchet 78a has a mutilated or interrupted portion in the form of a smooth surface 141 upon its peripheral edge and the purpose of which will be described hereinafter.

*Operation of the scraper knives*

A sprocket gear, such as 29, may be mounted upon the supporting shaft 30—34, and so as to be rotated relative thereto, by first loosening the key 40, then removing the knurled nut 32 from the threaded outer or front end portion 31 of the shaft 30, inserting the sprocket 29 upon the shaft 30, inserting the inner end portion 38 of the shaft 30 in the socket 37 which is formed in the shaft 34, tightening the key 40 so as to key the two parts 30 and 34 of the shaft 30—34 together, and then tightening the knurled nut 32, upon the shaft 30, against the action of the spring 44. When thus mounted upon the shaft 30—34 the sprocket gear 29 is free to be turned or rotated circumferentially in a step by step motion upon and relative to the shaft 30—34 by means of, and under the action of, the scraper knives 23—25 and 24—26, in a manner which will be described presently, while, at the same time, the spring 44 and the friction disc 41 and the stationary disc 41a cooperates to exert a braking action upon the shaft 30—34 to prevent rotation of the shaft 30—34 with the sprocket gear 29.

The motor 16 may then be set in operation, whereupon power is transmitted from the motor 16, through the motor shaft 17, V-shaped pulley 18, V-shaped belt 19, and V-shaped pulley 20, to the shaft 57. Power is transmitted from the shaft 57 by way of the gears 60 and 59, shaft 61, and gears 69 and 70 to the shaft 50 upon which the carrier or supporting arm 25 for the gear tooth scraper knife 23 is mounted, so as to operate the scraper knife 23.

At the same time power is transmitted from the shaft 57 by way of the gears 65 and 64, shaft 66, and gears 71 and 72 to the shaft 55 upon which the carrier or supporting arm 26 for the gear tooth scraper knife 22 is mounted, so as to operate the scraper knife 24.

It will thus be seen that the shafts 50 and 55 are rotated simultaneously but in opposite directions, that is to say, the shaft 50 is rotated in a counterclockwise direction, as seen in Fig. 2, while the shaft 55 is rotated in a clockwise direction as seen in the same figure.

When the shaft 50 is rotated in a clockwise direction, as seen in Fig. 2, an eccentric motion is imparted, by way of the eccentric member 49 and the eccentric bearing portion or opening 48 which is formed in the sleeve 47 of the supporting arm 25, to the supporting arm or carrier 25 and to the gear tooth scraper knife 23 carried thereby.

Similarly, when the shaft 55 is rotated in a clockwise direction, as seen in Fig. 2, an eccentric motion is imparted to the supporting arm 26 and to the scraper knife 24 carried thereby, by means of the eccentric member 54 and the bearing opening 53 which is formed in the sleeve portion 52 of the supporting arm 26.

As shown in Fig. 2, when the scraper knife 23 and its supporting arm or carrier 25 are disposed in lowered or effective position, that is, in position for the scraper knife 23 to engage successively the teeth 28 in the inner row of teeth upon the sprocket gear 29, the other scraper knife 24 and its supporting arm 26 are in raised or ineffective position, that is to say, out of position for the scraper knife 24 to engage the teeth 28 in the inner row of teeth 28 upon the sprocket gear 29.

As best shown in Figs. 9, 10, 11, 12 and 13, when an eccentric motion is thus imparted to the scraper knife 23 and its supporting arm 25, the path of movement of the scraper knife 23 is such that during the first part of its movement or normal orbital cycle of operation it moves somewhat downwardly, from dotted to full line position, Fig. 9. The scraper knife 23 and its supporting arm 25 then move laterally from the position in which they are shown in full lines in Fig. 9 into the position in which these parts are shown in full lines in Fig. 10. During this motion of the scraper knife 23 the flattened base or foot 142 of the notched or indented outer end portion 27 thereof bears upon the peripheral surface of the sprocket gear 29, in the space between two of the gear teeth 28 which are arranged in the inner row of gear teeth 28 upon the sprocket 29, and with one of the teeth 28 in the notch 27, as shown in Figs. 11 and 12.

The orbit or path of movement of the scraper knife 23 is such that as its beveled foot portion 142 moves into engagement with the peripheral surface 28a of the sprocket gear 29, in the space between two adjacent sprocket teeth 28, the scraper knife 23 moves laterally from the position in which it is shown in full lines in Fig. 9 into the position in which it is shown in Fig. 10, or from the position in which it is shown in Figs. 11 and 12, into the position in which it is shown in Fig. 13. During this movement of the scraper knife 23, the notched end portion 27 thereof engages at the base 28a of the tooth 28 and moves the sprocket gear 29 in a counterclockwise direction (Fig. 12).

As the scraper knife 23 moves laterally from the position in which it is shown in full lines in Fig. 9 into the position in which it is shown in Fig. 10, or from the position in which it is shown in full lines in Figs. 11 and 12, into the position in which it is shown in Fig. 13, it advances or moves the sprocket gear 29, upon the shaft 30—34, one circumferential step, in a counterclockwise direction as seen in Figs. 2, 9 and 13, and during and as a result of this movement the next succeeding or following gear tooth 28 moves under the outer and sharpened end portion of the scraper knife 23 and raises the outer and sharpened end portion thereof, against the action of the spring 131, from the position in which the outer and sharpened end portion of the scraper knife 23 is shown in Figs. 11 and 12 into the position in which it is shown in Fig. 13. During this upward movement of the scraper knife 23, the notched or indented knife portion 27 thereof engages the two corner edges 28c and 28d of the tooth 28 (Fig. 11), and rides up the face 28b of the tooth 28, thus scraping and slightly rounding the corner edges 28c and 28d of the gear tooth 28 and removing therefrom any burrs or sharp portions which may have been present or remained thereon after and as a result of the operation of forming or cutting or shaping the gear teeth 28 upon the sprocket gear 29. The scraper knife 23 and its supporting arm 25 then move laterally, from left to right as seen in Figs. 10 and 13, back into the position in which these parts are shown in Fig. 10, whereupon the scraper knife 23 and its supporting arm 25 again move downwardly and then again laterally, from right to left, as seen in Figs. 9 and 12, and into engagement with the next succeeding or following gear tooth 28, to effect the next cycle of operations. This cycle of operations is repeated until the corners or corner edge portions of all of the gear teeth 28 which are included in the inner row of such teeth 28 upon the sprocket gear 29 have been scraped and slightly rounded by means of the scraper knife 23 so that they will not tear those portions of motion picture films which define the marginal edge or corner portions of the sprocket tooth-receiving openings in such motion picture films and in which such sprocket teeth may engage in use.

Each time the scraper knife 23 moves through its normal cycle of operations, and each time the shaft 50 travels through one revolution to cause the scraper knife 23 to complete a scraping operation, the stud or pin 145, which is arranged in, and frictionally held in, the socket 73e of the gear 70, engages the lower end portion of the lever 75, as shown in Figs. 5 and 8, thereby pivoting the lever 75, at 74, against the action of the spring 85, and in a counterclockwise direction as seen in Fig. 5. This movement of the lever 75 causes the spring held pawl 76, which is carried thereby, to engage the ratchet 78a, thus advancing the ratchet 78a, the ratchet 78b, the spacing collars 80 and 105, and the cams 107 and 108, one circumferential step around and relative to the fixed or stationary supporting shaft 81, upon which these parts are mounted, it being understood that all of these parts are keyed together into a unitary structure, as indicated at 136, 137, and 130 in Fig. 7. During this operation these parts are held against retrograde movement by the engagement of the dog 116 with the teeth of the ratchet 78b. This operation is continued until the ratchet 78a, the ratchet 78, and the cams 107 and 108 have completed one revolution upon and relative to their supporting shaft 81, whereupon the pawl 76 engages in the mutilated or smooth surface portion 141 which is formed upon the peripheral edge of the ratchet 78a, said mutilated or smooth peripheral edge portion 141 of the ratchet 78a being best shown in Fig. 8.

As the cams 107 and 108 are thus moved, step by step, around and relative to the shaft 81, under the action of the stud 145, lever 75, pawl 76, and ratchet 78a, the cam follower or roller 112 upon the arm 111 rides over the peripheral edge or cam surface of the cam 107 and the cam follower or roller 110 on the arm 109 rides over the peripheral or cam surface of the cam 108. This motion of the ratchet 78a, as well as the ratchet 78b, and of the cams 107 and 108 is, however, interrupted when the pawl 76 engages the smooth or interrupted portion 141 which is formed upon the peripheral edge of the ratchet 78a and, when this occurs, the cam follower 110 upon the arm 109 rides up out of the mutilated portion 114 of the cam 108 and onto the rise of this cam 108. This motion of the cam follower 110 acts, through the arm 109, and the shaft 89, to rock the shaft 89 and the link 90, in a clockwise direction, as seen in Fig. 2, thereby raising the arm 92, which is carried by the link 90. As the arm 92 is thus raised the laterally projecting stud or pin 93, which is carried thereby, engages under the supporting arm or carrier 25 for the scraper knife 23, and thus lifts the scraper knife 23 and its supporting arm or carrier 25, against the action of the spring 131, into raised or ineffective position, thus placing the spring 131 under tension. During this upward movement of the arm 92 the same is guided by and between the guide pins 103 and 104, as shown in Fig. 2.

At the time when the cam follower 110 rides up onto the rise of the cam 108, to effect movement of the scraper knife 23 into raised or ineffective position, the scraper knife 24 is still in raised or ineffective position, as shown in Fig. 2, and at this time the cam follower 112 is in engagement with the rise of the cam 107.

Hence, it will be seen that at this time in the cycle of operations of the new gear tooth scraping device both of the scraper knives 23 and 24 are in raised or ineffective position and movement of the operating mechanism for the scraper knives 23 and 24 merely imparts an idling motion to the scraper knives, and during this idling motion the scraper knives 23 and 24 and their supporting arms 25 and 26, respectively, slide upon the laterally projecting pins or studs 93 and 99, respectively. It will be noted, in this connection, during this idling motion of the scraper knives 23 and 24 and their supporting arms 25 and 26, respectively, these parts slide through the yokes 143 and 144, respectively, by which the upper end portions of the springs 131 and 132 are loosely attached to the supporting arms 25 and 26 for the scraper knives 23 and 24, respectively.

With the scraper knives 23 and 24 thus both disposed in raised or ineffective position, further effective operation of the new gear tooth scraping device, and of the scraper knife 24, is effected as follows: To initiate further operation of the device, at this point in its normal cycle of operations, the manually operable key 120 and its supporting lever 118 are depressed and this motion rocks the lever 118 about its pivot, the shaft 95, thereby rocking the upwardly extending and slotted arm 121 of the lever 118 in a counterclockwise direction as seen in Fig. 2. This movement of the upwardly extending and slotted arm 121 of the lever 118 acts to pivot the lever 123—124, at 125, in a clockwise direction, as seen in Fig. 1. This movement of the lever 124 moves the bifurcated portion 127a of the pawl 127 into engagement with the teeth of the ratchet 78a, thus stepping the ratchet 78a, the ratchet 78b, and the two cams 107 and 108, and associated parts, one circumferential step around and relative to their supporting shaft 181, and thereby moving the smooth or mutilated portion 141 of the ratchet 78a past the pawl 76 so that the pawl 76 again engages with the teeth of the ratchet 78a.

At this time the cam follower 112 rides down off from the rise of the cam 107 and into the cut-out or mutilated portion 113 of this cam, and this movement of the cam follower 112 causes the then tensioned spring 132 to exert a downward pull upon the supporting arm 26, and the scraper knife 24 carried thereby; this downward movement of the supporting arm 26 and the scraper knife 24 carried thereby acting, through the stud 99 to rock the arm 98, the link 96 and the shaft 95, the arm 111 and the cam follower 112 carried thereby, in a clockwise direction, as seen in Fig. 2, thus lowering the scraper knife 24 and its supporting arm 26 into effective position.

During this downward movement the arm 98 is guided by and between the guide pins 100 and 101, (Fig. 2).

Accordingly, when the scraper knife 24 has thus been moved downwardly into lowered or effective position, and as the operation of the new gear tooth scraping device continues, the scraper knife 24 successively engages each of the teeth 28 which are included in the inner row of teeth 28 upon the sprocket gear 29, and which have been previously scraped by the scraper knife 23, and successively scrapes the two corner edges 28e and 28f of each of these teeth 28 which are opposite and complementary to the two corner edges 28c and 28d (Fig. 11) of each of said teeth 28 which have previously been scraped by the scraper knife 23.

During this movement the sprocket gear 29 is advanced in a circumferential or step by step movement, upon and relative to the supporting shaft 30—34, and in a clockwise direction as seen in Fig. 2, and after one complete revolution of the sprocket gear 29, the advancing pawl 76 again engages the mutilated or smooth peripheral edge portion 141 of the ratchet 78a, thereby again stopping the operation of the ratchet 78a, the ratchet 78b, and the cams 107 and 108 and associated parts. As this time the cam follower 112 upon the arm 111 rides up out of the mutilated portion 113 of the cam 107 and onto the rise of this cam, thus rocking the shaft 95 and the link 96, in a counterclockwise direction, as seen in Fig. 2. This movement of the shaft 95 and the link 96 acts, through the arm 98 and the laterally projecting pin or stud 99 which is carried thereby, to raise the supporting arm 26 and the scraper knife 24 which is carried thereby, against the action of the spring 132, into raised or ineffective position, thus completing a cycle of operations of the new sprocket gear tooth scraping device.

The retaining nut 32 may then be removed from the sprocket gear supporting shaft 30—34, whereupon the position of the sprocket gear 29 upon the shaft 30 may be reversed, thus moving the other or second and previously outer row of gear teeth 28 upon the sprocket gear 29 into a position in which each of the teeth therein may be scraped successively by the scraping knives 23 and 24. The operation of the new gear tooth scraping device may then be initiated, and the hereinbefore described cycle of operations may be repeated, by depressing the manually operable starting lever 118 through its key 120.

*Adjustment for sprocket gears of varying pitch*

By reference to Figs. 3 and 4, it will be noted that the shaft 50 has an enlarged and disc-shaped portion 133 which is arranged between the bearing or bracket plate 51 and the supporting arm or carrier 25 for the scraper knife 23, as shown in Fig. 3. The disc-shaped portion 133 of the shaft 50 is provided with a radially arranged row of sockets or recesses 134. Carried by the eccentric member 49, is a pin 135 which is selectively insertable into any one of the recesses or sockets 134 in the disc-shaped portion 133 of the shaft 50, and may be held therein by the retaining nut 146 which is mounted upon a threaded outer end portion 146a of the shaft 50, as shown in Fig. 3. This arrangement enables the eccentric member 49 to be adjusted upon and relative to the shaft 50 so as to vary the throw or extent of movement of the supporting arm or carrier 25 and the scraper knife 23 carried thereby so as to accommodate the throw or extent of movement of the scraper knife 23 to sprocket gears of varying pitch.

A construction identical to that just described is associated with the shaft 55, and the eccentric device 53—54 which cooperates therewith, so as to enable adjustment of the throw or extent of movement of the scraper knife 24 and its supporting arm 26 to sprocket gears of varying or different pitch.

It will also be noted, by reference to Figs. 5 and 6, that the recesses or sockets 73a, 73b, 73c, 73d, 73e and 73f are arranged at different or varying radial distances in and relative to the gear 70, and that the pin or stud 145 is selectively insertable into any one of the sockets 73a to 73f, inclusive, wherein it may be held by frictional engagement or otherwise.

As will be seen by reference to Figs. 5 and 6, the throw of the lever 75 and of the ratchet-advancing pawl 76 carried thereby may be controlled and varied by positioning the stud 145 in any selected one of the sockets or recesses 73a to 73f, inclusive, which are formed in the gear 70, that is to say, the position of the stud 145 upon and relative to the gear 70, and its radial distance from the shaft 50, controls the extent of movement or the throw of the lever 75 and the pawl 76 and thus determines the circumferential distance which the pawl 76 will advance the ratchet 78a, the ratchet 78b, the cams 107 and 108, and associated parts, at each operation of the lever 75 and the pawl 76 carried thereby. Hence, it will be seen that this construction and arrangement enables the new sprocket gear tooth scraping device to be adjusted for use in conjunction with sprocket gears of varying pitch.

It will also be understood and appreciated, in this connection, that the shape or configuration of the notched or indented and sharpened outer end portions 27 of the scraper knives 23 and 24 may be varied to accommodate these parts to sprocket gear teeth of varying configurations or shapes and of varying heights or depths.

It will be understood that the arrangement of the motor 16, power transmitting mechanism 17—18—19—20—57, and operating mechanism 21, and other parts of the new gear tooth scraping device, affords a compact, unitary and portable structure. It will be understood, however, that within the scope and contemplation of the present invention the motor 16, power transmitting mechanism 17—18—19—20—57, and associated parts may all be arranged as a permanent installation upon any suitable supporting base and that the new gear tooth scraping device need not necessarily be constructed as a portable unit, as shown.

It will thus be seen from the foregoing description, considered in conjunction with the accompanying drawings, that the present invention affords a novel device for mechanically and automatically scraping sprocket gears such, for example, as those which are used in the film advancing mechanisms of motion picture projectors, and the like, and thus accomplishes its intended objects including those which have been specifically pointed out hereinbefore, as well as others which are inherent in the invention.

I claim:

1. A sprocket gear scraping device comprising, in combination, means for supporting a sprocket gear, an elongated and substantially flat scraper knife having a notched knife edge portion, means for supporting said scraper knife, and means cooperating with said supporting means for said scraper knife for moving the said notched knife edge portion thereof generally tangentially of the gear along edge portions of each of the teeth of said sprocket gear so as to exert a scraping action simultaneously on both of said two edge portions of a gear tooth during each gear tooth scraping operation.

2. A sprocket gear scraping device as defined in claim 1 in which the said notched knife edge portion of said scraper knife is substantially triangular in shape and is adapted to engage and scrape two corner edge portions of one of the teeth of said sprocket gear during each scraping operation.

3. A sprocket gear scraping device as defined in claim 1 in which the said notched knife edge portion of said scraper knife is substantially triangular in shape and is adapted to engage and scrape two corner edge portions of one of the teeth of said sprocket gear during each scraping operation, and in which said sprocket gear scraping device the said notched portion of said scraper knife is raised or lifted upwardly relative to and in engagement with a tooth upon said sprocket gear during each scraping operation, and against the action of a spring, by means of the next succeeding or adjacent tooth upon said sprocket gear following the tooth upon which the scraping operation is being performed.

4. A sprocket gear scraping device as defined in claim 1 in which the said notched knife edge portion of said scraping knife has a beveled bottom edge which is adapted successively to engage and bear upon the peripheral surface of said sprocket gear at the base of each of the teeth thereon at one stage in the operation of said scraping knife upon each of said teeth.

5. A sprocket gear scraping device, comprising, in combination, a pair of sprocket gear tooth scraping knives, means for supporting a sprocket gear between said scraping knives, means for moving one of said scraping knives successively into engagement with each of the teeth in an annular row of teeth upon a sprocket gear supported by the said sprocket gear supporting means between said scraping knives so as to effect a scraping action upon each of the said teeth at one side thereof, and means for then successively moving the other of said scraping knives into engagement with each of the teeth in the said annular row of teeth upon said sprocket so as to effect a scraping operation upon each of the said teeth at the side thereof which is opposite to the side of said teeth which has been scraped by the said one of said scraping knives.

6. A sprocket gear scraping device as defined in claim 5 which includes means for automatically moving the said one of said scraping knives into ineffective position, that is, out of position to engage the teeth upon said sprocket gear after the said one of said scraping knives has completed a scraping operation upon each and all of the teeth in said annular row of the same, and which said sprocket gear scraping device includes means for then moving the other of said scraping knives into effective position, that is, into position successively to engage each of the said teeth in the said annular row of the same upon said sprocket gear so as to effect a scraping operation thereon.

7. A sprocket gear scraping device as defined in claim 5 which includes means for automatically moving the said one of said scraping knives into ineffective position, that is, out of position to engage the teeth upon said sprocket gear after the said one of said scraping knives has completed a scraping operation upon each and all of the teeth in said annular row of the same, and which said sprocket gear scraping device includes means for then moving the other of said scraping knives into effective position, that is, into position successively to engage each of the said teeth in the said annular row of the same upon said sprocket gear so as to effect a scraping operation thereon, and in which said sprocket gear scraping device the said means for moving the said other of said scraping knives into effective position includes a manually operable device for initiating movement of said other scraping device into effective position.

8. A sprocket gear scraping device as defined in claim 5 in which the said sprocket gear supporting means includes means enabling a sprocket gear supported thereby to be removed therefrom and its position thereon reversed axially of said sprocket gear after the said one of the said scraping knives has completed a scraping operation upon each of the teeth in an annular row of teeth upon said sprocket gear so that the teeth in another annular row of such teeth upon said sprocket gear may be disposed in position to be scraped by the said other one of said scraping knives.

9. A sprocket gear scraping device as defined in claim 5 which includes means for adjusting the throw or extent of movement of each of said scraping knives so as to accommodate the throw or extent of movement of each of the said scraping knives to different sprocket gears having teeth of varying or different pitch.

10. A sprocket gear scraping device comprising, in combination, means for supporting a sprocket gear, a scraper knife, means for supporting said scraper knife, means cooperating with said supporting means for moving said scraper knife successively into engagement with the teeth of a sprocket gear supported by said supporting means while at the same time imparting a circumferential or step by step movement to said sprocket gear relative to and upon said supporting means during and as an incident to each scraping operation, said sprocket gear scraping device including means for adjusting the throw or extent of movement of the said scraper knife so as to accommodate the throw of the said scraper knife to different sprocket gears having gear teeth of varying or different pitch.

11. A gear tooth scraping device specifically adapted for use in scraping the teeth of a gear of the type which embodies an annular row of circumferentially spaced gear teeth, and in which each of said gear teeth includes a tooth face having a pair of corner edges formed by the intersection of the said tooth face with the side walls of the said gear tooth, a notched scraping means, means for supporting said scraping means, means cooperating with said supporting means for the scraping means for moving the scraping means generally tangentially of the gear, means for supporting said gear, the scraping means adapted for simultaneous engagement and scraping along both of the said corner edges of the said gear tooth face during and as a part of a single scraping operation, and means for operating said scraping means to effect a simultaneous scraping action along both of the said corner edges of the gear tooth during each gear tooth scraping operation.

12. A gear tooth scraping device as defined in claim 11 which includes means for accommodating the movement of said gear tooth scraping means to gear teeth of varying or different pitch.

13. A gear tooth scraping device as defined in claim 11 in which the said scraping means comprises an elongated substantially flat scraper knife having one end thereof in the form of a notched scraping edge which is adapted to scrape both of the said corner edges of the said gear tooth simultaneously during each scraping operation.

14. A gear tooth scraping device as defined in claim 11 in which the said scraping means comprises a scraper knife having a notched scraping edge which is adapted to scrape both of the said corner edges of the said gear tooth simultaneously during each scraping operation, and in which said gear tooth scraping device includes an eccentric mounting mechanism for supporting said scraper knife and means cooperating with the said eccentric mounting mechanism for varying the throw and orbit of movement of said scraper knife so as to accommodate said scraper knife to gear teeth of varying or different pitch.

HARRY L. DENTON.